United States Patent
Ma et al.

(10) Patent No.: US 11,603,238 B2
(45) Date of Patent: Mar. 14, 2023

(54) LID WITH AUTOMATIC OPEN AND CLOSE RETENTION MECHANISM

(71) Applicant: THE CURATORS OF THE UNIVERSITY OF MISSOURI, Columbia, MO (US)

(72) Inventors: Hongbin Ma, Columbia, MO (US); Hao Bai, Columbia, MO (US); Michael Merwin, Columbia, MO (US); Christopher Vincent, Columbia, MO (US)

(73) Assignee: THE CURATORS OF THE UNIVERSITY OF MISSOURI, Columbia, MO (US)

(*) Notice: Subject to any disclaimer, the term of this patent is extended or adjusted under 35 U.S.C. 154(b) by 711 days.

(21) Appl. No.: 16/497,242

(22) PCT Filed: Jun. 1, 2018

(86) PCT No.: PCT/US2018/035528
§ 371 (c)(1),
(2) Date: Sep. 24, 2019

(87) PCT Pub. No.: WO2018/222953
PCT Pub. Date: Dec. 6, 2018

(65) Prior Publication Data
US 2020/0377272 A1 Dec. 3, 2020

Related U.S. Application Data

(60) Provisional application No. 62/514,261, filed on Jun. 2, 2017.

(51) Int. Cl.
*B65D 47/28* (2006.01)
*A47J 41/00* (2006.01)
(Continued)

(52) U.S. Cl.
CPC ....... *B65D 47/286* (2013.01); *A47G 19/2272* (2013.01); *A47J 41/0027* (2013.01); *B65D 51/1633* (2013.01)

(58) Field of Classification Search
CPC ............... B65D 47/286; B65D 51/1633; A47J 41/0027; A47G 19/2272
(Continued)

(56) References Cited

U.S. PATENT DOCUMENTS 3,739,938 A * 6/1973 Paz ..................... B65D 47/248
D7/510
4,212,408 A * 7/1980 Valenzona .......... A47G 19/2272
220/264

(Continued)

FOREIGN PATENT DOCUMENTS

WO 201811887676 A1 6/2018

OTHER PUBLICATIONS

International Search Report for corresponding PCT/US2018/035528 dated Oct. 30, 2018.

*Primary Examiner* — James N Smalley
(74) *Attorney, Agent, or Firm* — Sandberg Phoenix & von Gontard, PC

(57) ABSTRACT

A beverage container lid comprising a body having drinking hole and an air hole, and a slide-seal automatic Open and Close retention mechanism that comprises a sealing arm pivotally connected to the body, a movement and position retention linkage structured and operable to move the sealing arm between an Opened and a Closed position, a control mechanism slidingly disposed within the body and operably connected to the movement and position retention linkage such that movement of the control mechanism will control movement of the sealing arm between the Opened and Closed positions, and a biasing device structured and operable to exert constant force on the sealing arm, such that (Continued)

force exerted by the biasing device in combination with the structure and operation of the movement and position retention linkage will selectively retain the sealing arm in the Opened position and in the Closed position.

12 Claims, 4 Drawing Sheets

(51) Int. Cl.
*B65D 51/16* (2006.01)
*A47G 19/22* (2006.01)

(58) Field of Classification Search
USPC .............................................. 220/254.5, 715
See application file for complete search history.

(56) References Cited

U.S. PATENT DOCUMENTS

| | | | |
|---|---|---|---|
| 6,098,834 A * | 8/2000 | Hatsumoto | A47G 19/2272 220/756 |
| 6,702,137 B1 | 3/2004 | Kowa et al. | |
| 8,360,258 B2 | 1/2013 | Gilbert et al. | |
| 8,727,176 B2 | 5/2014 | El-Saden et al. | |
| 10,336,513 B2 * | 7/2019 | Wodka | B65D 51/1683 |
| 2004/0108336 A1 | 6/2004 | Tardif | |
| 2006/0226160 A1 | 10/2006 | Elsaden et al. | |
| 2007/0210093 A1 * | 9/2007 | Pinelli | B65D 43/20 220/715 |
| 2010/0206835 A1 | 8/2010 | Yu | |

* cited by examiner

LID WITH AUTOMATIC OPEN AND CLOSE RETENTION MECHANISM

CROSS-REFERENCE TO RELATED APPLICATIONS

The present invention is the US national stage under 35 U.S.C. § 371 of International Application No. PCT/US2018/035528, which was filed on Jun. 1, 2018, and which claims the priority of U.S. Provisional Application No. 62/514,261, filed on Jun. 2, 2017. The disclosure of the above applications are incorporated herein by reference in their entirety.

FIELD

The present teachings relate beverage container lids, and more particularly to a beverage container lid with an automatic position retention Open and Close mechanism.

BACKGROUND

The statements in this section merely provide background information related to the present disclosure and may not constitute prior art.

There are many beverage containers, e.g., thermal insulating beverage containers, on the market today. Such containers typically include a removable lid and are often structured and operable to minimize (i.e., slow down) the rejection of heat from the liquid beverage disposed within the container. Such known lids typically include at least one drinking aperture through which a beverage within the container can exit the container to allow a person to consume the beverage. Such known lids also often include at least one air aperture that allows ambient air to be drawn into the container as the beverage exits through drinking aperture, thereby allowing a smooth flow of the beverage through the drinking aperture.

In many instances such known lids additionally include an aperture covering device that is structured and operable to be controllably moved (e.g., slid, rotated, pivoted, etc.) between a Closed position and an Opened position. In the Closed position the aperture covering device generally covers the drinking aperture(s) (and in various instances the air aperture(s)) to inhibit or prevent the beverage from unintentionally passing through the drinking aperture(s) (and in various instances the air aperture(s)). In the Opened position the aperture covering device generally exposes the drinking aperture(s) (and in various instances the air aperture(s)) to allow the beverage to easily exit the container, via the drinking aperture, so that the consumer can drink the beverage.

Often such known aperture covering devices do not tightly seal the drinking and/or air apertures such that the beverage can undesirably splash, spill, leak or otherwise escape from the container. Additionally, often such known aperture covering devices can inadvertently and undesirably move from the Closed position to the Opened position (or some position therebetween) due to movement, jostling and/or vibration of the container and/or lid, thereby allowing the beverage to undesirably splash, spill, leak or otherwise escape from the container.

SUMMARY

The present disclosure generally provides a removable drinking container lid that comprises an automatic position retention Open and Close mechanism. In various embodiments, the lid is removably attachable to a mouth or open end, of a drinking container (not shown) and generally includes a body and a locking slide switch mechanism.

In various embodiments the present disclosure provides a lid for a beverage container, wherein the lid comprises a body having a drinking hole and an air hole, and slide-seal automatic Open and Close retention mechanism. In various instances the slide-seal automatic Open and Close retention mechanism comprises: a sealing arm pivotally connected to the body; a movement and position retention linkage structured and operable to move the sealing arm between an Opened and a Closed position; a control mechanism slidingly disposed within the body and operably connected to the movement and position retention linkage such that movement of the control mechanism will control movement of the sealing arm between the Opened and Closed positions; and a biasing device structured and operable to exert constant force on the sealing arm, such that force exerted by the biasing device in combination with the structure and operation of the movement and position retention linkage will selectively retain the sealing arm in the Opened position and in the Closed position.

In various embodiments the movement and position retention linkage can comprise a base linkage arm stationarily connected to the sealing arm, and a pivoting linkage arm pivotally connected at a proximal end portion to a distal end portion of the base linkage arm and pivotally connected at a distal end to a control button of the control mechanism or pivotally disposed at the distal end at a specific location within the control button.

In various embodiments the body can further comprise a sealing arm guide post extending internally from a wall of the body, wherein the guide post is structured and operable to guide and stabilize movement of the sealing arm between the Opened and Closed positions.

In various embodiments the slide-seal automatic Open and Close retention mechanism can further comprise: a drinking hole seal connected to the sealing arm at a distal end thereof such that when the sealing arm is in the Closed position the drinking hole seal will form a substantially fluid-tight seal around the drinking hole; and an air hole seal is connected to the sealing arm at an intermediary portion thereof such that when the sealing arm is in the Closed position the air hole seal will form a substantially air-tight seal around the air hole.

In various embodiments, the biasing device can comprise one or more torsion spring.

In various embodiments the biasing device can comprise one or more compressing springs.

In other various embodiments the present disclosure provides a method for retaining a beverage container lid in an Opened and a Closed position. The lid comprises a body having a drinking hole and an air hole, and slide-seal automatic Open and Close retention mechanism. The slide-seal automatic Open and Close retention mechanism includes a sealing arm pivotally connected to the body, a control button, a movement and position retention linkage having a base linkage arm connected to the sealing arm and a pivoting linkage arm pivotally connected at a proximal end to the base linkage arm and pivotally connected to or pivotally disposed within the control button at a distal end, and a biasing device. In such instances the method comprises: applying constant force to the sealing arm utilizing the biasing device; moving the control button to a Closed position, thereby orienting a longitudinal axis of the pivoting linkage arm and a longitudinal axis of the base linkage arm to have a closed angle defined therebetween, such that a first portion of the biasing device force is distributed along the axis of the base linkage arm, and a second portion of the biasing device is distributed along the axis of the pivoting linkage arm, thereby retaining the control button in the Closed position; and moving the control button to an Opened position, thereby orienting the axis of the pivoting linkage arm and the axis of the base linkage arm to have a opened angle defined therebetween, such that a third portion of the biasing device force is distributed along the axis of the base linkage arm, and a fourth portion of the biasing device is distributed along the axis of the pivoting linkage arm, thereby retaining the control button in the Opened position.

In various embodiments the method can further comprise guiding and stabilizing movement of the sealing arm between the Opened and Closed positions utilizing a sealing arm guide post that extends internally from a wall of the body.

In various embodiments the method can further comprise positioning a drinking hole seal connected to the sealing arm at a distal end thereof over the drinking hole such that when the sealing arm is in the Closed position the drinking hole seal will form a substantially fluid-tight seal around the drinking hole.

In various embodiments the method can comprise positioning an air hole seal connected to the sealing arm at an intermediary portion thereof over the air hole such that when the sealing arm is in the Closed position the air hole seal will form a substantially air-tight seal around the drinking hole.

In various embodiments, applying constant force to the sealing arm utilizing the biasing device can comprise applying constant force to the sealing arm utilizing one or more torsion spring.

In various embodiments, applying constant force to the sealing arm utilizing the biasing device can comprise applying constant force to the sealing arm utilizing one or more compressing spring.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

Corresponding reference numerals indicate corresponding parts throughout the several views of drawings.

DETAILED DESCRIPTION

Figure 1:
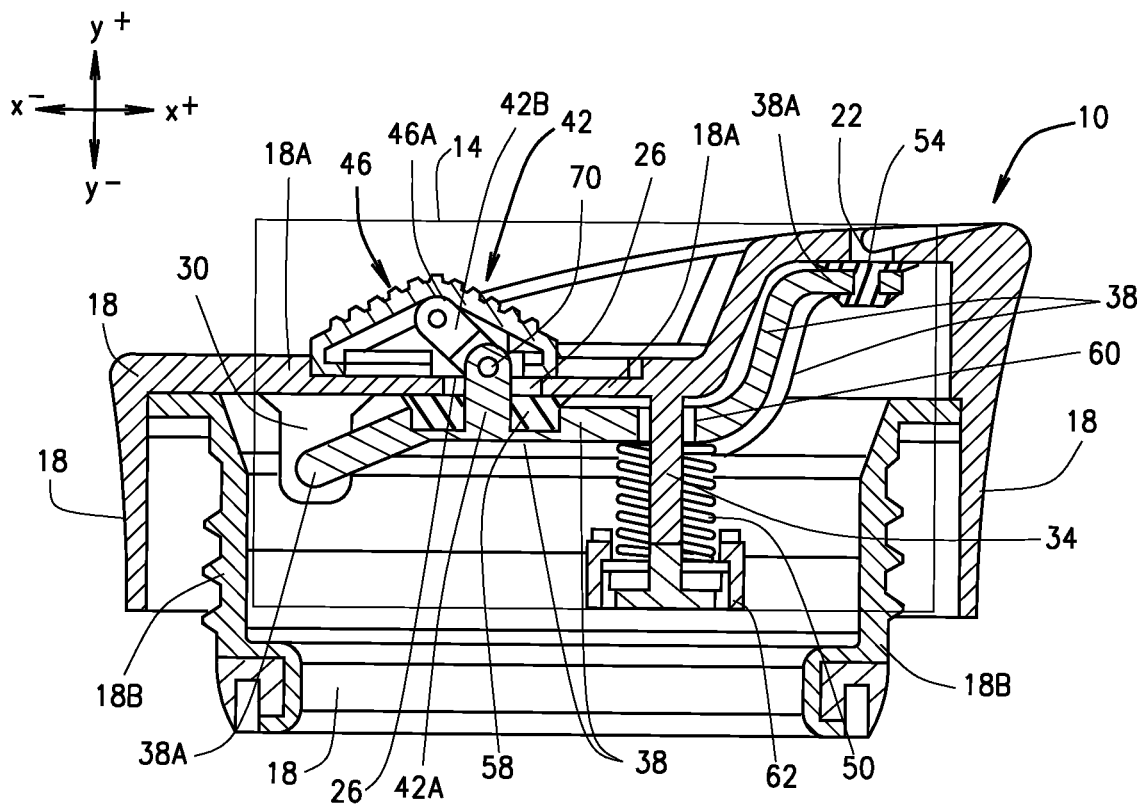
FIG. 1 is an exemplary cross-sectional view of a beverage container lid having a slide-seal automatic position retention Open and Close mechanism, wherein the slide-seal automatic Open and Close retention mechanism is shown in a Closed position, in accordance with various embodiments of the present disclosure.
Figure 2:
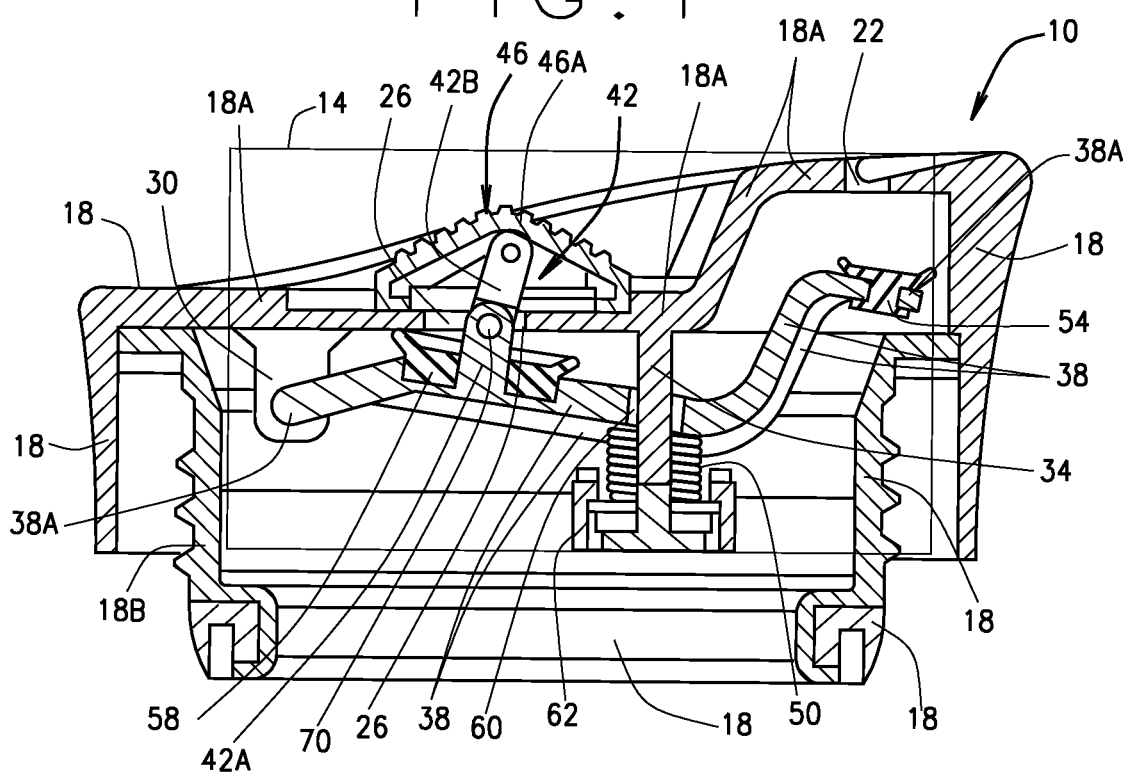
FIG. 2 is an exemplary cross-sectional view of the beverage container lid with the slide-seal automatic Open and Close retention mechanism shown in FIG. 1, wherein the slide-seal automatic Open and Close retention mechanism is shown in an Opened position, in accordance with various embodiments of the present disclosure.

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on," "engaged to or with," "connected to or with," or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on," "directly engaged to," "directly connected to," or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between," "adjacent" versus "directly adjacent," etc.).

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

Referring now to FIGS. 1 through 8, in various embodiments, the present disclosure provides a removable beverage container lid 10 comprising a slide-seal automatic Open and Close retention mechanism (SSAOCRM) 14. As described herein, the SSAOCRM 14 is structured and operable to selectably configure the lid 10 in an Opened configuration and a substantially liquid-tight sealed Closed configuration and automatically retain the lid 10 in the Opened and Closed configurations. The lid 10 can be structured and operable to be removably connectable to any beverage container, for example any hot and/or cold beverage container or thermos, or any thermally insulated beverage container such as that described in PCT application PCT/US2017/067239, filed Dec. 19, 2017, titled, Heat Exchanging Thermal Liquid Container, the disclosure of which is incorporated herein by reference in its entirety. The lid 10 can be removably connectable to any such beverage container via any suitable connection means, mechanism, system, device, apparatus or system, such as threaded connection, gasket or O-ring sealed press on/in connection, snap on/in connection, twist-lock connection, etc., and remain within the scope of the present disclosure.

More particularly, the lid 10 is removably connectable to a mouth or open end of the beverage container and generally includes a body 18 to which and in which the SSAOCRM 14 is operatively connected and disposed. The lid body 18 generally includes a drinking hole, opening or aperture 22, an air hole 26, opening or aperture 26, a sealing arm connection boss 30 extending internally from an interior surface of a wall of the body 18, and a sealing arm guide post 34 extending internally from an interior surface of a wall of the body 18. The drinking hole 22 extends through a top wall 18A of the of the lid body 18 such that any liquid or fluid (e.g., a consumable beverage) disposed within the beverage container to which the lid 10 is connected can flow through the drinking hole 22 and be dispensed from the container. The air hole 26 extends through the top wall 18A of the of the lid body 18 such that air can be drawn into the beverage container to which the lid 10 is connected to displace the liquid or fluid (e.g., consumable beverage) being dispensed from the container through the drinking hole 22 such that the liquid or fluid (e.g., consumable beverage) will flow very smoothly and evenly through the drinking hole 22.

The sealing arm connection boss 30 can extend from any interior surface of the body and is structured and operable to provide a pivoting connection to a sealing arm 38 of the SSAOCRM 14 (described further below). For example, as exemplarily illustrated in FIGS. 1 and 2, in various embodiments, the sealing arm connection boss 30 can extend from an interior surface of a top wall 18A of the body 18. Or, it is envisioned that in various embodiments the sealing arm connection boss 30 can extend from an interior surface of a sidewall 18B of the body 18, or any other interior surface of the body 18. In various embodiments, the sealing arm guide post 34 extends from the interior surface of the top wall 18A and is structured and operable to guide and stabilize operation and movement of sealing arm 38 as described further below.

In various embodiments, the slide-seal automatic Open and Close retention mechanism (SSAOCRM) 14 comprises the sealing arm 38, a movement and position retention linkage 42, a control mechanism 46, a biasing device 50, a drinking hole seal 54, and an air hole seal 58. The sealing arm 38 is pivotally connected at proximal end 38A to the connection boss 30 such that the sealing arm 38 can pivot up and down relative to the interior surface of the top wall 18A (i.e., toward and away from the interior surface of the top wall 18A) between a Closed position (shown in FIGS. 1 and 3) and an Opened position (shown in FIGS. 2 and 4), respectively. Movement of the sealing arm 38 between the Closed and the Opened positions is controlled by movement of the control mechanism 46 as described below. In various instances, the sealing arm 38 can be shaped to operably coincide with the contour of the interior surface of the top wall 18A. For example, as exemplarily illustrated throughout the Figures, in various embodiments the top wall 18A can have a raised drinking portion 18A1 in which the drinking hole 22 is disposed such that the interior surface of the top wall 18A has an L-like cross-sectional contour. In such instances, the sealing arm 38 can have an L-like shape that coincides with the interior surface of the top wall 18A. In various embodiments, the sealing arm 38 can comprise a guide hole 60 through which the guide post 34 extends. Accordingly, during operation and movement of the sealing arm 38 between the Opened and Closed position, the sealing arm 38 is guided and prevented from lateral movement (i.e., movement substantially orthogonal to up/closing and down/opening movement of the sealing arm 38) via the guide post 34 and guide post hole 60. Particularly, the interoperability of the guide post 34 and the guide post hole 60 guide and stabilize operation and movement of the sealing arm 38 as the sealing arm 38 moves between the Opened and Closed positions.

The drinking hole seal 54 is connected to, mounted to, or integrally formed with the sealing arm 38 at a distal end thereof such that when the sealing arm 38 is in the Closed position (FIGS. 1 and 3), the drinking hole seal 54 will cover and surround the drinking hole 22 and form a substantially fluid/liquid-tight seal around the drinking hole 22. Particularly, when the sealing arm 38 is in the Closed position the drinking hole seal 54 will be pressed against the interior surface of the top wall 18A over and around the drinking hole 22 via force from the biasing device (as described below) such that any liquid or fluid (e.g., a consumable beverage) cannot be dispensed, flow, splash, spill, leak or otherwise escape, via the drinking hole 22, from the beverage container to which the lid 10 is connected. Contrarily, when the sealing arm 38 is moved to the Opened position, via the control mechanism 46 (as described below), the drinking hole seal 54 is moved away from the drinking hole 22 such that any liquid or fluid (e.g., a consumable beverage) disposed within the respective container can be easily dispensed.

The air hole seal 58 is connected to, mounted to, or integrally formed with the sealing arm 38 at an intermediary portion thereof such that when the sealing arm 38 is in the Closed position (FIGS. 1 and 3), the air hole seal 58 will cover and surround the air hole 26 and form a substantially air-tight (and substantially fluid/liquid-tight) seal around the air hole 26. Particularly, when the sealing arm 38 is in the Closed position the air hole seal 58 will be pressed against the interior surface of the top wall 18A over and around the air hole 26 via force from the biasing device (as described below) such that air cannot pass through air hole 26 (and liquid cannot be discharged, via the air hole 26, from the beverage container to which the lid 10 is connected). Contrarily, when the sealing arm 38 is moved to the Opened position, via the control mechanism 46 (as described below), the air hole seal 58 is moved away from the air hole 26 such that air can be easily drawn into the respective container through the air hole 26 to displace the liquid or fluid (e.g., consumable beverage) being dispensed from the container through the drinking hole 22 such that the liquid or fluid (e.g., consumable beverage) will flow very smoothly and evenly through the drinking hole 22.

The biasing device 50 can be any biasing device structured and operable to apply a constant force to the sealing arm 38 strong enough to force the sealing arm 38 up toward the interior surface of the lid body top wall 18A and force and hold the drinking and air hole seals 54 and 58 against the interior surface of the top wall 18A, over and around the respective drinking and air holes 22 and 26, such that the drinking and air hole seals 54 and 58 form a fluid/liquid-tight and air-tight seal around the respective drinking and air holes 22 and 26. For example, as exemplarily shown in FIGS. 1 and 2, in various embodiments the biasing device 50 can comprise a compression spring disposed around the sealing arm guide post 34 between a spring base 62 and a bottom side of the sealing arm 38. In such instances, the compression spring is structured and operable to compress when the sealing arm 38 is moved to the Opened position (FIG. 2) and to extend when the sealing arm 38 is moved to the Closed position. Particularly, when the sealing arm 38 is moved to the Closed position the compression spring extends or expands to apply a force on the sealing arm 38 sufficient to force and hold the drinking and air hole seals 54 and 58 against the interior surface of the top wall 18A, and over and around the respective drinking and air holes 22 and 26 to form fluid/liquid-tight and air-tight seals around the respective drinking and air holes 22 and 26.

Figure 3:
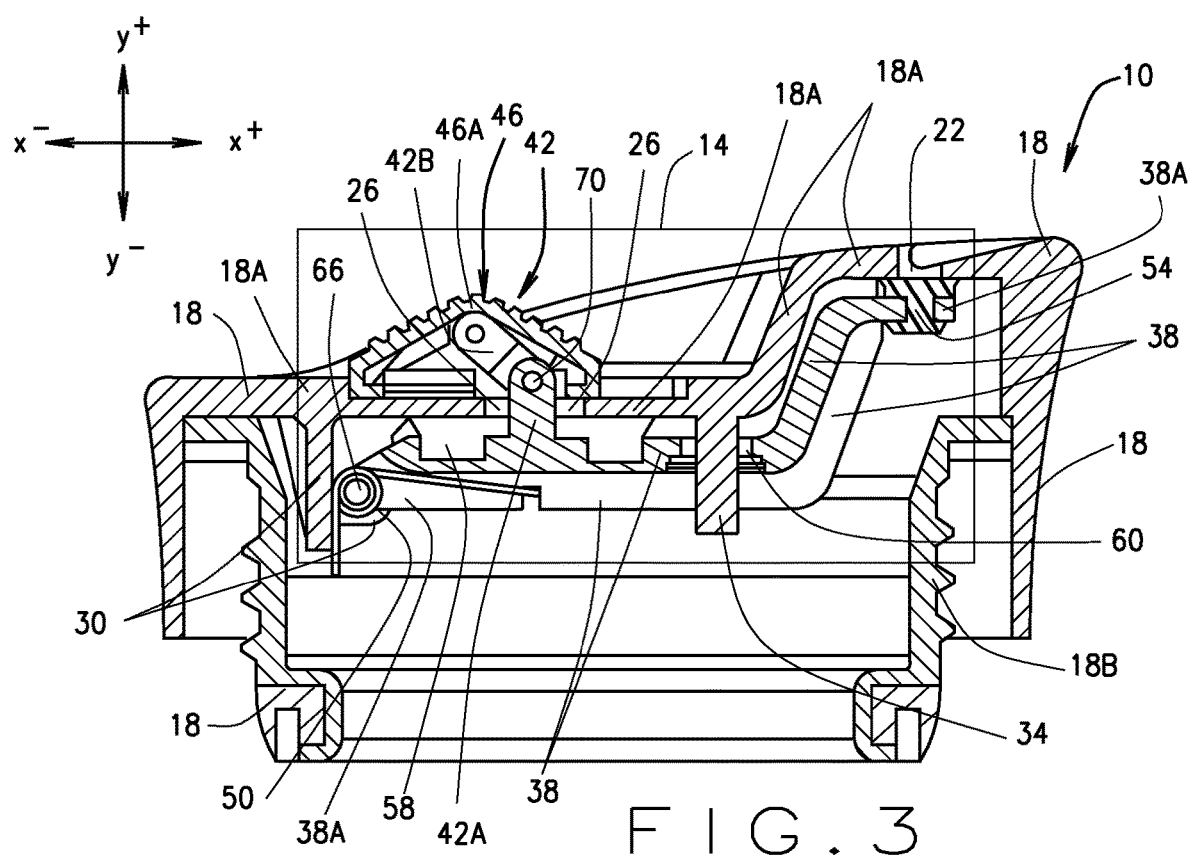
FIG. 3 is an exemplary cross-sectional view of the beverage container lid with the slide-seal automatic Open and Close retention mechanism in the Closed position, in accordance with various other embodiments of the present disclosure.
Figure 4:
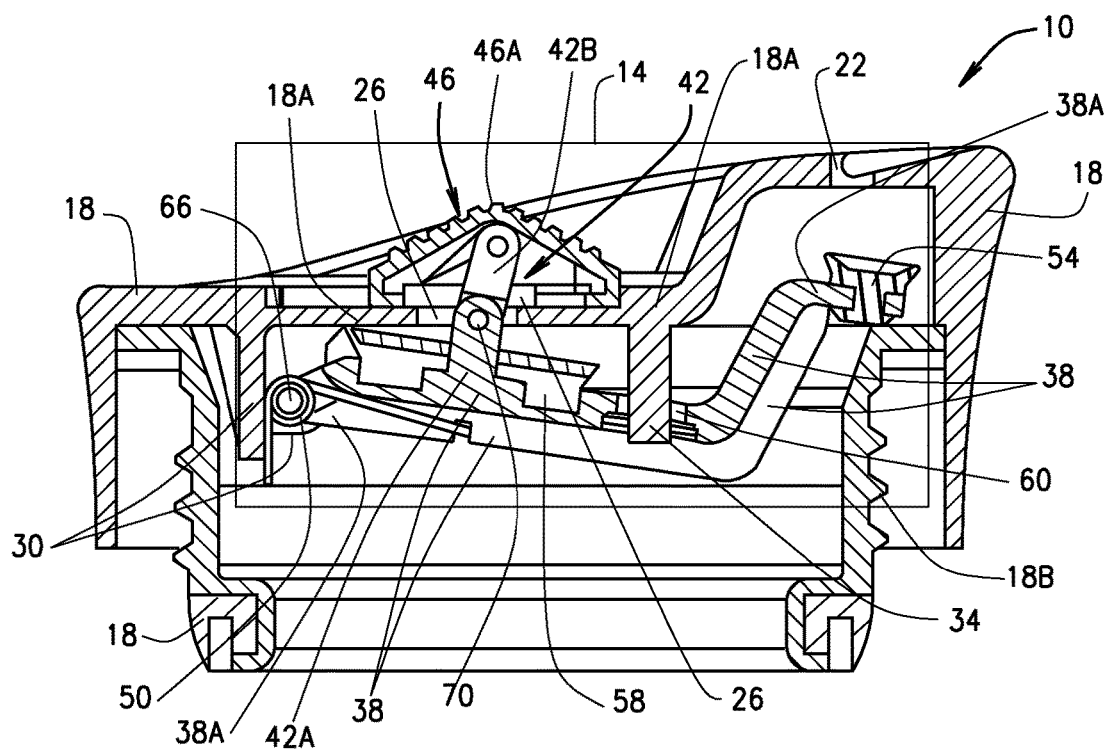
FIG. 4 is an exemplary cross-sectional view of the beverage container lid shown in FIG. 5 with the slide-seal automatic Open and Close retention mechanism in the Opened position, in accordance with various embodiments of the present disclosure.

Alternatively, in other exemplary embodiments, as shown in FIGS. 3 and 4, the biasing device 50 can comprise one or more torsion spring disposed around one or more pivot pins 66 connected to or integrally formed with connection boss 30. In such instances, the torsion spring(s) is/are structured and operable to wind, tighten or constrict when the sealing arm 38 is moved to the Opened position (FIG. 4) and to unwind, uncoil or expand when the sealing arm 38 is moved to the Closed position. Particularly, when the sealing arm 38 is moved to the Closed position the torsion spring(s) unwind(s) or uncoil(s) to apply a force on the sealing arm 38 sufficient to force and hold the drinking and air hole seals 54 and 58 against the interior surface of the top wall 18A, and over and around the respective drinking and air holes 22 and 26 to form fluid/liquid-tight and air-tight seals around the respective drinking and air holes 22 and 26. In such instances, the sealing arm 38 can be pivotally connected to the sealing arm connection boss 30 via the pivot pins 66. In yet other exemplary embodiments, it is envisioned that the biasing device could be any other device suitable for applying force to sealing arm 38 as described above, e.g., rubber or elastic bands, biasing lever arms integrally formed with the sealing arm 38, magnets disposed in the sealing arm 38 and/or lid body 18, etc.

The control mechanism 46 is slidingly connected to the top wall 18A of the lid body 18 such that it cannot be dislodged from the lid 10 but can be pushed, slid and moved slide in an X− and an X+ direction between a Closed position, shown in FIGS. 1, 3, 5 and 7, and an Opened position, shown in FIGS. 2, 4, 6 and 8. The control mechanism 46 can be slidingly connected to the top wall 18A via any suitable sliding connection means, mechanism, system or device. For example, in various embodiments, the control mechanism 46 can have base platform (not shown) that has a larger footprint than a control button that extends above the exterior surface of the top wall 18A and is utilized to move the control mechanism 46 between the Opened and Closed positions. In such embodiments, the base platform can be slidingly disposed within a slotted cavity disposed within the top wall 18A and structured/formed to receive and slidingly retain the base platform such that the control mechanism 46 can be moved between the Opened and Closed positions via manual manipulation of the control button.

Figure 5:
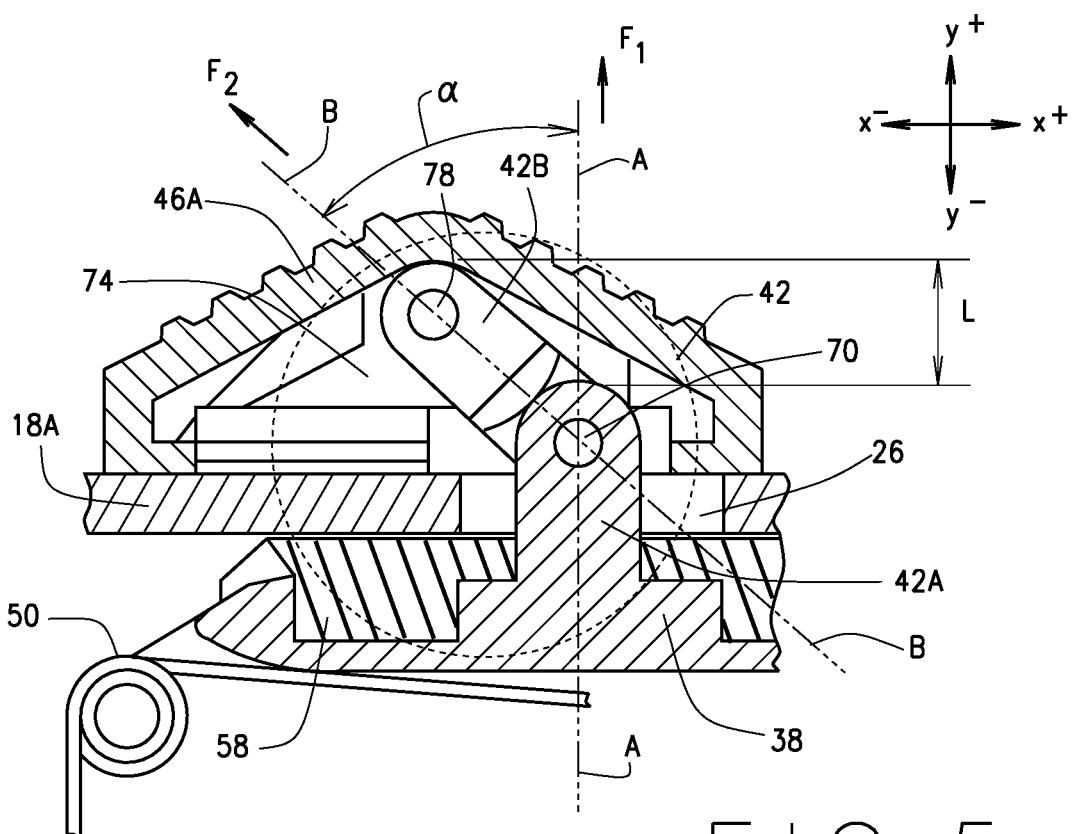
FIG. 5 is an illustration of a movement and position retention linkage of the slide-seal automatic Open and Close retention mechanism shown in FIGS. 1, 2, 3 and 4 when the slide-seal automatic Open and Close retention mechanism is in the Closed position, in accordance with various embodiments of the present disclosure.
Figure 6:
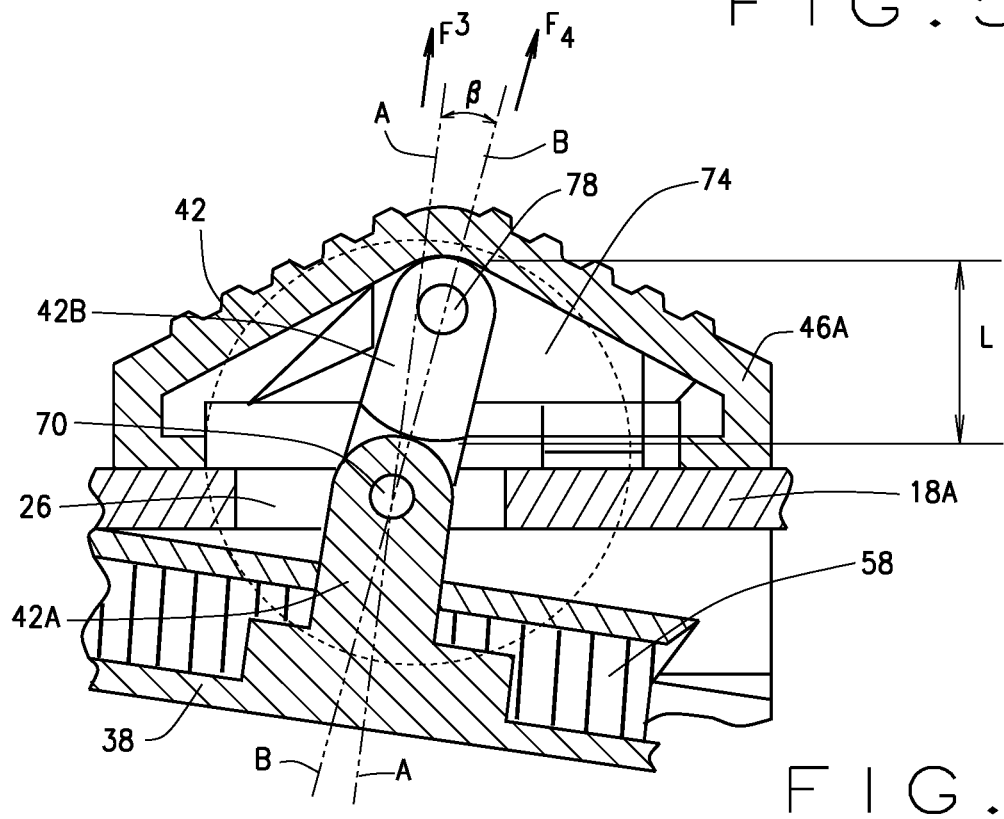
FIG. 6 is an illustration of the movement and position retention linkage of the slide-seal automatic Open and Close retention mechanism shown in FIGS. 1, 2, 3 and 4 when the slide-seal automatic Open and Close retention mechanism is in the Opened position, in accordance with various embodiments of the present disclosure.
Figure 7:
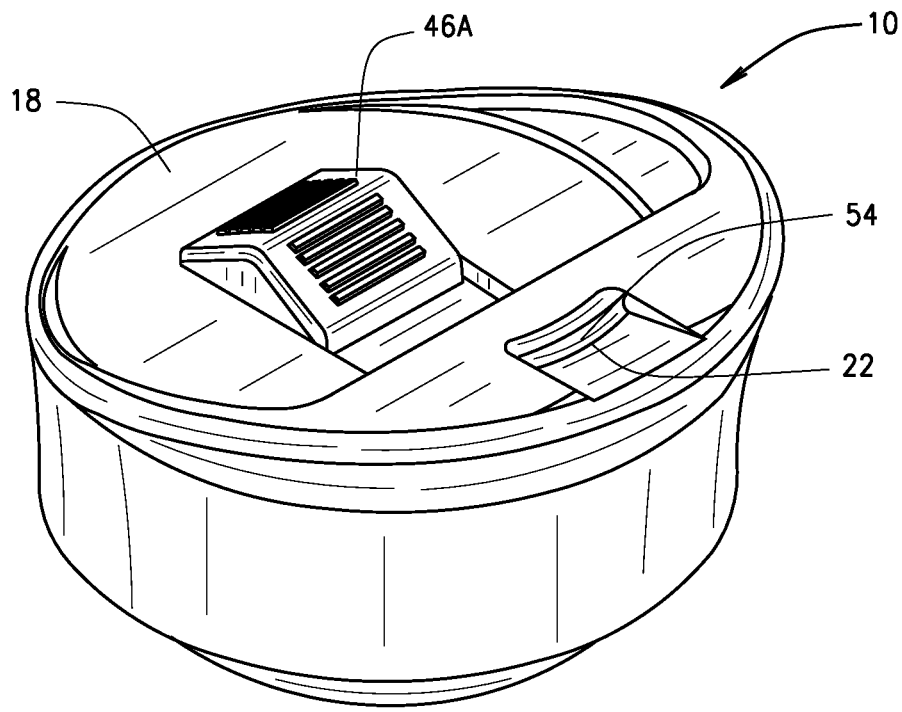
FIG. 7 is an exemplary isometric view of the beverage container lid shown in FIGS. 1 and 3 with the slide-seal automatic Open and Close retention mechanism in the Closed position, in accordance with various embodiments of the present disclosure.
Figure 8:
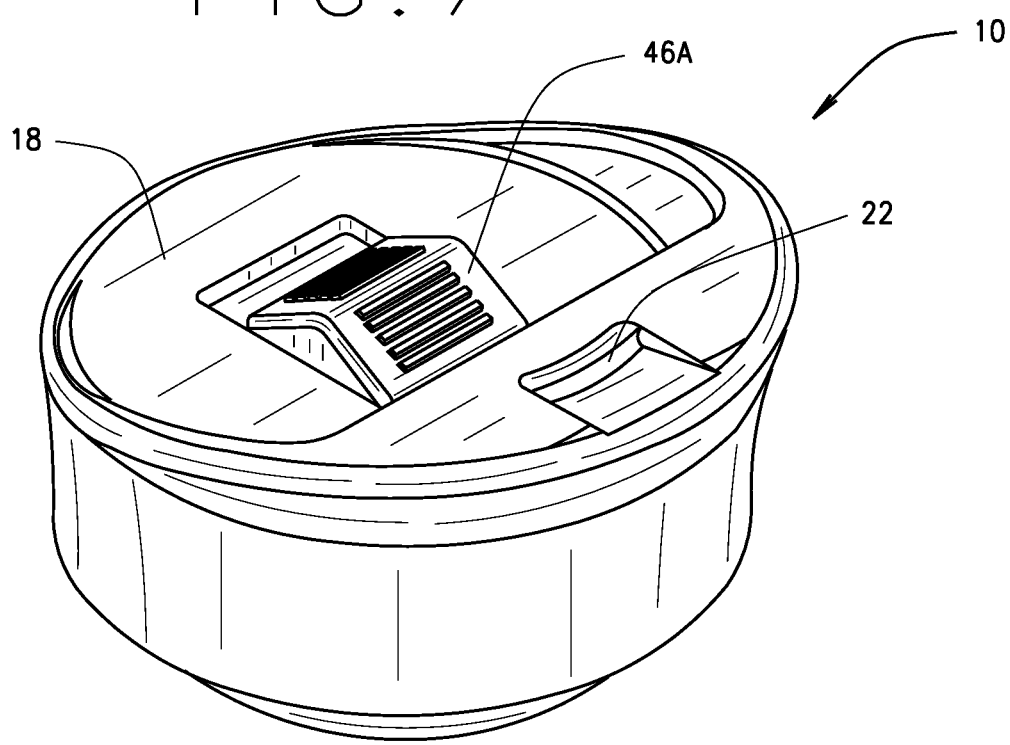
FIG. 8 is an exemplary isometric view of the beverage container lid shown in FIGS. 1 and 3 with the slide-seal automatic Open and Close retention mechanism in the Opened position, in accordance with various embodiments of the present disclosure.

Referring particularly to FIGS. 5 and 6, in various embodiments, the control mechanism 46 comprises a hollow control button 46A that extends above the exterior surface of the top wall 18A and can be manually manipulated to move the control mechanism 46 between the Opened and Closed positions. In various embodiments, the movement and position retention linkage 42 comprises a base linkage arm 42A that is stationarily fixed or connected to, or integrally formed with the sealing arm 38, and a pivoting linkage arm 42B that is pivotally connected at a proximal end portion to a distal end portion of the base linkage arm 42A via one or more base pivot pin(s) or post(s) 70. The base linkage arm 42A has a longitudinal axis A and the pivoting linkage arm has a longitudinal axis B. The pivoting linkage arm 42B extends into an interior button cavity 74 of the control button 46A.

In various instances, the pivoting linkage arm 42B can be pivotally connected at a distal end to the control button 46A via one or more button pivot pin or posts 78. Alternatively, in various embodiments, the control button 46A can be formed to have an apex in the interior cavity 74 (as exemplarily illustrated in the Figures), such that due to the geometries of the interior cavity 74 and the movement and position retention linkage 42 (e.g., the shape of the walls of the interior cavity 74 and longitudinal lengths of the base and pivoting linkage arms 42A and 42B) the distal end of the pivoting linkage arm is retained within the apex of the interior cavity 74. In either instance, the distal end of the pivoting linkage arm 42B is pivotally retained at a specific location within the interior cavity 74 (e.g., at the apex when the interior cavity 74 has a triangular shape). Although the control button 46A is shown in the various figures to have a triangular shape, the control button 46A can any desired shape as long as the distal end of the pivoting linkage arm 42B is pivotally retained at a specific location within the interior cavity 74, and remain within the scope of the present disclosure.

As described above, the SSAOCRM 14 structured and operable to selectably configure the lid 10 in an Opened configuration and a substantially liquid-tight and air-tight sealed Closed configuration and automatically retain the lid 10 in the Opened and Closed configurations. More specifically, the force of the biasing device and the geometries of the interior cavity 74 and the movement and position retention linkage 42 are structured and operable to selectably position and retain the sealing arm 38 in Closed position and to selectably position and retain the sealing arm 38 in the Opened position, via movement (e.g., sliding) of the control button 46A to the respective Closed and Opened positions. As used herein the phases 'retained in the Closed position' and 'retained in the Opened position' will be understood to mean that the sealing arm 38 will be retained in the respective Closed and Opened position such that general movement, jostling, bumping, disturbance, shaking, etc., of the lid 10 during normal use with not unintentionally move the sealing arm 38 from the respective Closed and Opened positions. More particularly, once the SSAOCRM 14 is placed in the Closed or Opened position, via manually manipulation or movement of the control button 46A (as described herein) the SSAOCRM 14 will be retained in the respective Closed or Opened position until the SSAOCRM 14 is intentionally moved to the respective Opened or Closed position, via manual manipulation or movement of the control button 46A.

As described above, the biasing device 50 exerts an upward force (i.e., a force toward the interior surface of the top wall 18A) on the sealing arm 38. More specifically, the force exerted by the biasing device 50 on the sealing arm 38 will be in the direction of and along the axis A of the base linkage arm 42A. Since the base linkage arm 42A is stationarily fixed or connected to, or integrally formed with the sealing arm 38, the force of the biasing device 50 is further exerted on the base linkage arm 42A. Moreover, since the pivoting linkage arm 42B is pivotally connected to the base linkage arm 42A, the force is translated to the pivoting linkage arm 42B via the one or more base pivot pin(s) or post(s) 70. Still further, since the pivoting linkage arm 42B is pivotally connected to the control button 46A, or otherwise pivotally disposed within the cavity 74, with the distal end retained at a specific location as described above, the force is further applied to and resisted by control button 46A.

As described above, the force exerted by the biasing device 50 on the sealing arm 38 will be in the direction of and along the axis A of the base linkage arm 42A. Hence, when the control button 46A is moved to the Closed position, as illustrated in FIG. 5, a portion $F_1$ of the force will be directed or distributed along the axis A, and due to the pivoting connection of the pivoting linkage arm 42B to the base linkage arm 42A, a portion $F_2$ of the force will be directed or distributed along the axis B. Further, since the distal end of the pivoting linkage arm 42B is pivotally retained at a specific location within the control button interior cavity 74, the portion $F_2$ of the force distributed along the axis B will retain the control button 46A in the Closed position. Additionally, the alignment and orientation of the base and pivoting arms 42A and 42B relative to each other will allow the portion $F_1$ of the force distributed along the axis A to retain the sealing arm 38 in the Closed position, whereby the drinking and air holes 22 and 26 are sealed as described above. More specifically, when in the Closed position, the position of the control button 46A relative to the base linkage arm 42A is such that a closed angle $\alpha$ is created between the axis A of the base linkage arm 42A and the axis B of the pivoting linkage arm 42B. The angle $\alpha$ is large enough to allow the sealing arm 38 and base linkage arm 42A to move upward toward the lid top wall 18A far enough to position the sealing arm 38 in the Closed position.

More specifically, the angle $\alpha$ is large enough such that a length of displacement L along the axis A that is determined by the angle $\alpha$ and the resulting orientation of the pivoting linkage arm 42B relative to the base linkage arm 42A (as one skilled in the art will readily recognize) is short enough to allow the sealing arm 38 and base linkage arm 42A to move upward toward the lid top wall 18A far enough to position the sealing arm 38 in the Closed position. The length of displacement L will be understood to be the distance in a direction $Y^+$ between the top of the pivoting linkage arm 42B and the top of the base linkage arm 42A, which will change as the orientation of the pivoting linkage arm 42B relative to the base linkage arm 42A changes (as one skilled in the art will readily recognize). Accordingly, due to the portion $F_2$ of the force exerted by the biasing device 50 and the angle $\alpha$ of the pivoting linkage arm 42B relative to the base linkage arm 42A the control button 46A will be retained in the Closed position. Furthermore, to move the control button 46A from the Closed position to the Opened position, a manual force must be applied to the control button 46A that is greater than the portion $F_2$ of the force such that the pivoting linkage arm 42B can be pivoted to the Opened position.

Similarly, when the control button 46A is moved to the Opened position, as illustrated in FIG. 6, a portion $F_3$ of the force will be directed or distributed along the axis A, and due to the pivoting connection of the pivoting linkage arm 42B to the base linkage arm 42A, a portion $F_4$ of the force will be directed or distributed along the axis B. Further, since the distal end of the pivoting linkage arm 42B is pivotally retained at a specific location within the control button interior cavity 74, the portion $F_4$ of the force distributed along the axis B will retain the control button in the Opened position. Additionally, the alignment and orientation of the base and pivoting arms 42A and 42B relative to each other will hold the sealing arm 38 in the Opened position. More specifically, when in the Opened position, the position of the control button 46A relative to the base linkage arm 42A is such that a opened angle β is created between the axis A of the base linkage arm 42A and the axis B of the pivoting linkage arm 42B. The angle β is less than the angle α and therefore the length of displacement L with the control button 46A in the Opened position will be greater than the length of displacement L with the control button 46A in the Closed position.

When control button 46A is moved in the $X^+$ direction (exemplarily illustrated in the figures) from the Closed to the Opened position the pivoting linkage arm 42B will rotate at its proximal end about the base pivot pin(s) 70 and the distal end will be moved by the control button 46A in the $X^+$. As will be readily understood by one skilled in the art, as the distal end of pivoting linkage arm 42B is moved in the $X^+$ direction, via movement of the control button 46A from the Closed to the Opened position, the displacement length L will increase. Moreover, since the distal end of the pivoting linkage arm 42B is pivotally mounted to or within the control button 46A of the control mechanism 46, and the control mechanism 46 cannot be dislodged from the lid 10, as the displacement length L increases during movement of the control button 46A from the Closed to the Opened position, the pivoting linkage arm 42B will displace the sealing arm 38 and force or push it downward into the Opened position. As described above, when the control button 46A is in the Opened position, the axis B of the pivoting linkage arm 42B will be at the angle β relative to the axis A of the base linkage arm. 42A. Accordingly, due to the portion $F_4$ of the force exerted by the biasing device 50 and the angle β of the pivoting linkage arm 42B relative to the base linkage arm 42A the control button 46A will be retained in the Opened position. Furthermore, to move the control button 46A from the Opened position to the Closed position, a manual force must be applied to the control button 46A that is greater than the portion $F_4$ of the force such that the pivoting linkage arm 42B can be pivoted to the Closed position.

Furthermore, as will be readily understood by one skilled in the art, when the control button 46A is moved from the Opened position to the Closed position and vice versa, the force of the biasing device 50 acting on a pivoting linkage arm 42B along the axis B will vary from the portion $F_4$ of the biasing device force when the control button 46A is in the open position, to a maximum force exerted by the biasing device 50 when the axis B is collinear with the axis A, to the portion $F_2$ of the biasing device force. Due to the orientation of the pivoting linkage arm 42B in relation to the base linkage arm 42A throughout movement of the control button 46A between the Closed and Opened positions, which defines the angles α and β therebetween, the portion $F_2$ of biasing device force when the control button 46A is in the Closed position will be less than the portion $F_4$ of biasing device force when the control button 46A is in the Opened position.

In general summary, as described above, when the control button/mechanism 46A/46 is moved from the Opened position to the Closed position, the structure and operation of the control mechanism 46 and the movement and position retention linkage 42: 1) applies the portion $F_1$ of the biasing device force to the sealing arm 38 to seal the drinking and air holes 22 and 26 in a substantially fluid-tight and air-tight manner; and 2) applies the portion $F_2$ of the biasing device force along the axis B at the angle α with the axis A, which substantially retains the control button/mechanism 46A/46 in the Closed position such that general movement, jostling, bumping, disturbance, shaking, etc., of the lid 10 during normal use with not unintentionally move the control button/mechanism 46A/46 and the sealing arm 38 from the respective Closed position. Similarly, when the control button/mechanism 46A/46 is moved from the Closed position to the Opened position, the structure and operation of the control mechanism 46 and the movement and position retention linkage 42: 1) will displace the sealing arm 38 and force or push the sealing arm 38 downward into the Opened position, thereby exposing the drinking and air holes 22 and 26 such that a liquid (e.g., a consumable beverage) disposed within a container to which the lid 10 is attached can be easily, evenly and smoothly dispensed through the drinking hole 22; and 2) applies the portion $F_4$ of the biasing device force along the axis B at the angle β with the axis A, which substantially retains the control button/mechanism 46A/46 in the Opened position such that general movement, jostling, bumping, disturbance, shaking, etc., of the lid 10 during normal use with not unintentionally move the control button/mechanism 46A/46 and the sealing arm 38 from the respective Open position.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:
1. A lid for a beverage container, said lid comprising:
  a body, the body comprising:
    a drinking hole disposed within the body; and
    an air hole disposed within the body; and
  slide-seal automatic Open and Close retention mechanism, the slide-seal automatic Open and Close retention mechanism comprising:
    a sealing arm pivotally connected to the body, the sealing arm comprising:
      a drinking hole seal structured and operable to fit against an interior surface of a top wall of the body to cover and form a liquid-tight seal around the drinking hole when the sealing arm is a closed position; and
      an air hole seal structured and operable to fit against the interior surface of the top wall of the body to cover and form a liquid-tight seal around the air hole when the sealing arm is the closed position;
    a movement and position retention linkage structured and operable to move the sealing arm between an Opened position and the Closed position;
    a control mechanism slidingly disposed within the body and operably connected to the movement and position retention linkage such that movement of the control mechanism will control movement of the sealing arm between the Opened position and Closed position; and a biasing device structured and operable to exert constant force on the sealing arm, such that force exerted by the biasing device in combination with the movement and position retention linkage will selectively retain the sealing arm in the Opened position and in the Closed position.

2. The lid of claim 1, wherein the movement and position retention linkage comprises:

a base linkage arm stationarily connected to the sealing arm; and a pivoting linkage arm pivotally connected at a proximal end portion to a distal end portion of the base linkage arm and one of pivotally connected at a distal end to a control button of the control mechanism or pivotally disposed at the distal end at a specific location within the control button.

3. The lid of claim 1, wherein the body further comprises a sealing arm guide post extending internally from a wall of the body, the guide post structured and operable to guide and stabilize movement of the sealing arm between the Opened and Closed positions.

4. The lid of claim 1, wherein the slide-seal automatic Open and Close retention mechanism further comprises:

a drinking hole seal connected to the sealing arm at a distal end thereof such that when the sealing arm is in the Closed position the drinking hole seal will form a substantially fluid-tight seal around the drinking hole; and an air hole seal is connected to the sealing arm at an intermediary portion thereof such that when the sealing arm is in the Closed position the air hole seal will form a substantially air-tight seal around the air hole.

5. The lid of claim 1, wherein the biasing device comprises one or more torsion spring.

6. The lid of claim 1, wherein the biasing device comprises one or more compressing springs.

7. A method for retaining a beverage container lid in an Opened and a Closed position, the lid comprising a body having a drinking hole and an air hole, a slide-seal automatic Open and Close retention mechanism including a sealing arm pivotally connected to the body, a control button, a movement and position retention linkage having a base linkage arm connected to the sealing arm and a pivoting linkage arm pivotally connected at a proximal end to the base linkage arm and pivotally connected to or pivotally disposed within the control button at a distal end, and a biasing device, said method comprising:

applying constant force to the sealing arm utilizing the biasing device;

moving the control button to a Closed position, thereby orienting a longitudinal axis of the pivoting linkage arm and a longitudinal axis of the base linkage arm to have a first closed angle defined therebetween, such that a first portion of the biasing device force is distributed along the axis of the base linkage arm, and a second portion of the biasing device is distributed along the axis of the pivoting linkage arm, thereby retaining the control button in the Closed position; and moving the control button to an Opened position, thereby orienting the axis of the pivoting linkage arm and the axis of the base linkage arm to have a second opened angle defined therebetween, such that a third portion of the biasing device force is distributed along the axis of the base linkage arm, and a fourth portion of the biasing device is distributed along the axis of the pivoting linkage arm, thereby retaining the control button in the Opened position, the first closed angle being different than second closed angle.

8. The method of claim 7 further comprising guiding and stabilizing movement of the sealing arm between the Opened and Closed positions utilizing a sealing arm guide post that extends internally from a wall of the body.

9. The method of claim 7 further comprising positioning a drinking hole seal connected to the sealing arm at a distal end thereof over the drinking hole such that when the sealing arm is in the Closed position the drinking hole seal will form a substantially fluid-tight seal around the drinking hole.

10. The method of claim 7 further comprising positioning an air hole seal connected to the sealing arm at an intermediary portion thereof over the air hole such that when the sealing arm is in the Closed position the air hole seal will form a substantially air-tight seal around the drinking hole.

11. The method of claim 7, wherein applying constant force to the sealing arm utilizing the biasing device comprises applying constant force to the sealing arm utilizing one or more torsion spring.

12. The method of claim 7, wherein applying constant force to the sealing arm utilizing the biasing device comprises applying constant force to the sealing arm utilizing one or more compressing spring.

* * * * *